(12) United States Patent
Ren et al.

(10) Patent No.: US 11,794,290 B2
(45) Date of Patent: Oct. 24, 2023

(54) METHOD FOR FORMING CUTTERS

(71) Applicants: CNPC USA Corporation, Houston, TX (US); Beijing Huamei, Inc., Beijing (CN)

(72) Inventors: Jiaxiang Ren, Katy, TX (US); Chris Cheng, Houston, TX (US)

(73) Assignees: CNPC USA Corporation, Houston, TX (US); Beijing Huamei, Inc., Beijing (CN)

( * ) Notice: Subject to any disclaimer, the term of this patent is extended or adjusted under 35 U.S.C. 154(b) by 483 days.

(21) Appl. No.: 17/156,592

(22) Filed: Jan. 24, 2021

(65) Prior Publication Data

US 2022/0234151 A1    Jul. 28, 2022

(51) Int. Cl.
*B23P 15/28* (2006.01)
*F16J 15/3284* (2016.01)
*E21B 10/567* (2006.01)

(52) U.S. Cl.
CPC ............ *B23P 15/28* (2013.01); *E21B 10/567* (2013.01); *F16J 15/3284* (2013.01)

(58) Field of Classification Search
CPC ...... B23P 15/28; E21B 10/567; F16J 15/3284
USPC ................... 76/108.1, 108.2–108.6
See application file for complete search history.

(56) References Cited

U.S. PATENT DOCUMENTS

| | | | | |
|---|---|---|---|---|
| 3,583,712 A | * | 6/1971 | Domros | F16J 15/3284 277/440 |
| 2007/0169419 A1 | | 7/2007 | Davis et al. | |
| 2010/0011673 A1 | * | 1/2010 | Shamburger | B24D 3/06 51/307 |
| 2010/0012390 A1 | * | 1/2010 | Shamburger | E21B 10/567 427/419.7 |
| 2010/0012391 A1 | * | 1/2010 | Shamburger | E21B 10/567 175/434 |
| 2012/0151847 A1 | | 6/2012 | Ladi et al. | |
| 2013/0247478 A1 | | 9/2013 | Bellin et al. | |
| 2015/0014067 A1 | | 1/2015 | Muzzi et al. | |
| 2015/0337618 A1 | * | 11/2015 | Hern | E21B 33/1291 166/376 |
| 2020/0240522 A1 | * | 7/2020 | Ongerth | F16J 15/3472 |
| 2022/0234151 A1 | * | 7/2022 | Ren | F16J 15/102 |

* cited by examiner

*Primary Examiner* — Omar Flores Sanchez (74) *Attorney, Agent, or Firm* — Craft Chu PLLC; Andrew W. Chu (57) ABSTRACT

The method for forming cutters includes applying a protective layer on an O-ring so as to form a protected O-ring. The protected O-ring is placed around a cutter body having a substrate section and diamond section with a metallic binder. The method includes inserting the cutter body into the pod cavity and leaching the metallic binder through an end portion of the diamond section for at least one day at 60 degrees Celsius or higher so as to form a polycrystalline diamond compact cutter from the cutter body. The protected O-ring seals the substrate section during the step of leaching. The step of leaching forms an exposed O-ring from the protected O-ring with a hardness reduction and a modulus reduction that identifies a time window for maintaining a sealing force to protect the substrate, while achieving the target profile of the diamond table for a high quality and reliable cutter.

20 Claims, 5 Drawing Sheets

METHOD FOR FORMING CUTTERS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to polycrystalline diamond compact cutters on a drill bit. More particularly, the present invention relates to a method for forming cutters. The present invention relates to protecting the cutter during leaching to remove the metallic binder of the cutter body.

2. Description of Related Art Including Information Disclosed Under 37 CFR 1.97 and 37 CFR 1.98

Polycrystalline diamond compact (PDC) cutters are commonly used in drilling operations for oil and gas. PDC cutters are diamond tipped protrusions on a drill bit. The PDC cutters form the cutting surface of the drill bit with diamond, while the drill bit can be comprised of other materials. Drill bits were tipped with diamond for improved cutting efficiency through rock formations. Bonding diamond to metal is a challenge.

A basic PDC cutter is comprised of a diamond table made from diamond grit with binder and a substrate of another composite material, usually tungsten carbide, and metallic binder, usually cobalt. The diamond grit is sintered under high temperature and high pressure conditions, forming a layer as a diamond table bonded to the tungsten carbide or other substrate. The High Temperature-High Pressure (HT-HP) press can form the diamond table with a Cobalt or other Group VIII element as the catalyst binder, and the properties of the layer have been modified for various thicknesses, profiles, and patterns to affect the working life of the cutters.

The PDC cutter is further processed to withstand the downhole conditions of extreme pressures and high temperatures. Excessive heat, over 750 degrees Celsius, causes thermal expansion of the diamond-binder bond in the diamond table, causing changes to the integrity of the cutter. To reduce the susceptibility to high temperatures, the cutter is subjected to a leaching process, which removes metallic binder from the diamond table using acid. Selective leaching removes the binder, usually cobalt, in different percentages through the volume of the diamond table so that the cutter is resistant to thermal expansion. However, the selective leaching affects other properties of the cutter, such as fracture toughness. Even though the cutter is more resistant to thermal expansion, the cutter may be less tough.

Various patents have issued, and various applications have been published in the field of measuring PDC compact cutters. U.S. Patent Publication No. 2007/0169419A1, published on 26 Jul. 2007 for Davis et al, describes sonochemical leaching of polycrystalline diamond. U.S. Patent Publication No. 2012/0151847A1, published on 21 Jun. 2012 for Ladi et al, describes another type of leaching of polycrystalline diamond elements. U.S. Patent Publication No. 2013/0247478A1, published on 26 Sep. 2013 for Bellin et al, also discloses a leaching process. U.S. Patent Publication No. 2015/0014067A1, published on 15 Jan. 2015 for Muzzi et al, discloses another leaching process with cutter protection.

The prior art O-ring of the known methods is made of fluoroelastomers with good acid resistance, such as fluoroelastomer (FKM) or a copolymer of tetrafluoroethylene and propylene (FEPM). However, the sealing force of the prior art O-ring in acids at high temperatures cannot be maintained. The acid degrades the prior art O-ring over time, which results in the damage to substrate or insufficient removal of the metallic binder from the diamond table. The percentage of removing of cobalt from the diamond table or the pattern of removed cobalt is incomplete. Due to the manufacturing process, prior art PDC cutters can be made with low quality or even be fatally defective.

It is an object of the present invention to form a polycrystalline diamond compact (PDC) cutter.

It is an object of the present invention to increase the time and cost efficiency of forming a PDC cutter.

It is another object of the present invention to maintain the sealing force of an O-ring during the step of leaching when forming a PCD cutter for a drill bit.

It is still another object of the present invention to apply a protective layer to an O-ring during the step of leaching when forming a PCD cutter.

It is yet another object of the present invention to have less hardness reduction of a protected O-ring during the step of leaching conditions when forming a PCD cutter.

It is yet another object of the present invention to have less modulus reduction of a protected O-ring during the step of leaching conditions when forming a PCD cutter.

These and other objectives and advantages of the present invention will become apparent from a reading of the attached specifications and appended claims.

BRIEF SUMMARY OF THE INVENTION

The method for forming cutters includes setting a back cap into a pod so as to form an assembly with a pod cavity and applying a protective layer on an O-ring so as to form a protected O-ring. The protected O-ring is placed around a cutter body having a substrate section and diamond section with a metallic binder. The method includes inserting the cutter body into the pod cavity so as to seal the substrate section within the pod. An end portion of the diamond section extends outward from the pod. The method also includes leaching the metallic binder through the end portion of the diamond section for at least one day or 1-3 days at 60 degrees Celsius or higher so as to form a polycrystalline diamond compact cutter from the cutter body. The protected O-ring seals the substrate section from the leaching conditions, such as strong acids. The protected O-ring becomes an exposed O-ring in the step of leaching, having a hardness reduction relative to the protected O-ring and a modulus reduction relative to the protected O-ring. The hardness reduction and the modulus reduction of the exposed O-ring are less than the hardness reduction and the modulus reduction than an exposed unprotected O-ring, that is, an O-ring without the protective layer of the invention. The exposed O-ring can maintain a sealing force to protect the substrate for at least one day or 1-3 days, while achieving the target profile of the diamond table during that one day or 1-3 days.

In one embodiment, the step of applying the protective layer is coating a poly (para-xylene) on the O-ring so as to form a coated layer as the protective layer.

In another embodiment, the step of applying the protective layer is coating a fluoropolymer on the O-ring so as to form a fluoro-coated layer as the protective layer. The step of coating the fluropolymer includes applying the fluoropolymer by liquid suspension on a surface of the O-ring, drying the fluoro-coated layer, and heating the fluoro-coated layer and the O-ring to form the protected O-ring. Alternatively, the step of coating the flluropolymer includes melt-coating the fluoropolymer on the O-ring.

In still another embodiment, the step of applying the protective layer is fluorinating a surface of the O-ring so as to form a fluorination layer as the protective layer.

In yet another embodiment, the step of applying the protective layer is encapsulating the O-ring with an encapsulated fluoropolymer so as to form an encapsulated layer as the protective layer.

DETAILED DESCRIPTION OF THE INVENTION

The present invention relates to a protective layer for an O-ring to withstand the exposure to high strength acidic conditions and high temperatures while maintaining sufficient sealing force in a method of forming a PDC cutter. Protecting the O-ring from degradation by a protective layer must be balanced against increasing hardness reduction. The additional complications are the elevated temperature conditions and reduced time of exposure. Being able to withstand the acid for longer periods of time still must accommodate the time needed to seal for leaching. The present invention is a method that applies a layer to the O-ring that adds protection from acid at higher temperatures, while still being able to seal for the time needed for leaching metallic binder from the diamond table. The method maintains enough hardness and modulus for sufficient sealing force against the cutter body for the needed time in the high strength acidic and high temperature conditions.

Figure 1:
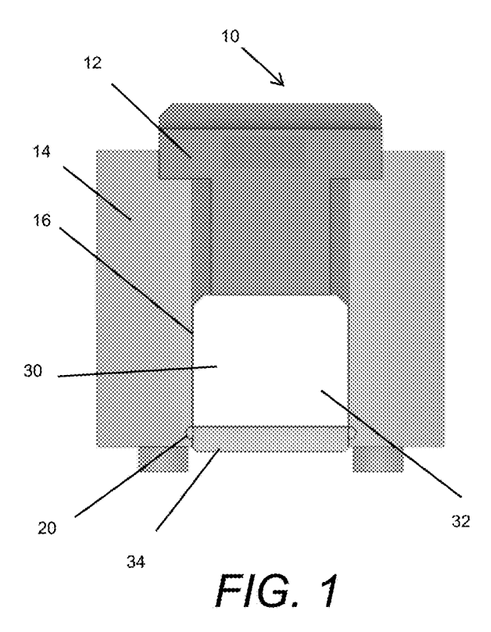
FIG. 1 shows a cross-sectional view of an assembly for manufacturing cutters according to the present invention.
Figure 2:
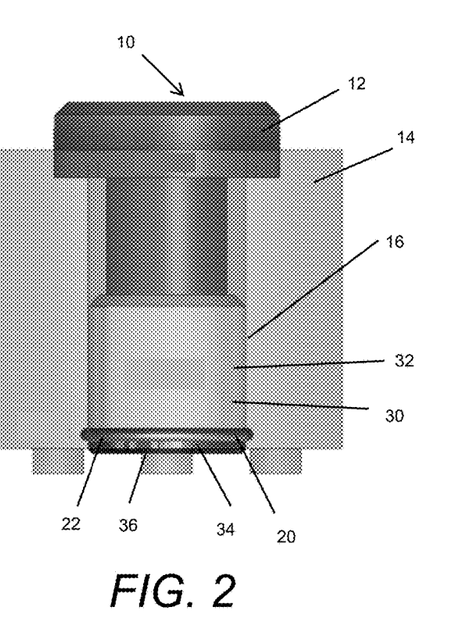
FIG. 2 is an elevation view of the assembly of FIG. 1.
Figure 3:
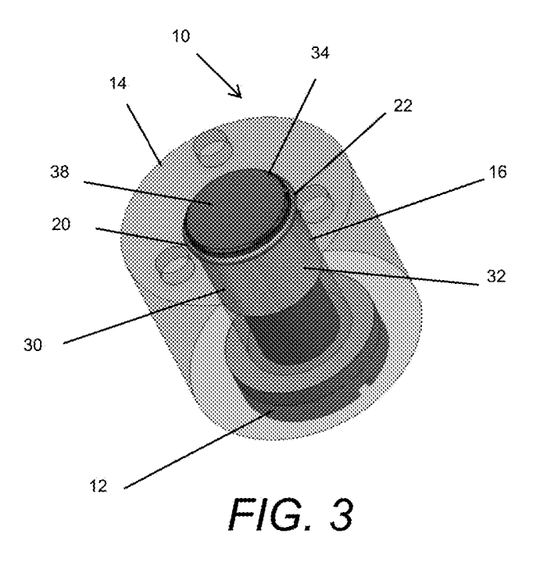
FIG. 3 is a perspective view of the assembly of FIG. 1.

FIG. 1 shows a cross-sectional view of an assembly 10 for manufacturing cutters. FIG. 2 is an elevation view of the assembly 10 of FIG. 1, and FIG. 3 is a perspective view of the assembly 10 of FIG. 1. The method of the present invention includes setting a back cap 12 into a pod 14 so as to form the assembly 10 with a pod cavity 16. The pod 14 can be comprised of at least one of polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

Figure 4:
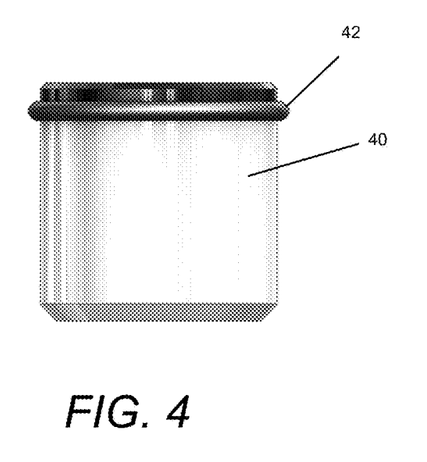
FIG. 4 is an elevation view of the polycrystalline diamond compact cutter from the cutter body after the step of leaching.

FIG. 4 is an elevation view of the polycrystalline diamond compact cutter 40 from the cutter body 30 after the step of leaching. FIG. 4 also shows an elevation view of the exposed O-ring 42. In the present invention, the method includes applying a protective layer 22 on the O-ring 20 so as to form a protected O-ring. The O-ring can be comprised of at least one of nitrile butadiene rubber (NBR), hydrogenated nitrile butadiene rubber (HNBR), Ethylene-propylene diene monomer (EPDM), Epichlorohydrin (ECO), Polyacrylic rubber (ACM), Fluorosilicone rubber (FVMQ), Fluoroelastomers (FKM), Copolymer of tetrafluoroethylene and propylene (FEPM), perfluoroelastomer (FFKM), and Silicone rubber. The protected O-ring undergoes the step of leaching so as form the exposed O-ring 42.

FIGS. 1-3 show the steps of placing the protected O-ring around a cutter body 30. FIGS. 1-4 show the cutter body being comprised of a substrate section 32 and diamond section 34 being comprised of a metallic binder 36. The substrate section 32 can be tungsten carbide, and the metallic binder 36 can be cobalt. Then, the cutter body 30 is inserted into the pod cavity 16 so as to seal the substrate section 32 within the pod 14 of FIGS. 1-2.

The diamond section 34 is comprised of an end portion 38 extending outward from the pod 14. The end portion 38 is sealed to the substrate section 32 by the protected O-ring. In the present invention, the method includes leaching the metallic binder 36 through the end portion 38 of the diamond section 34. Strong acids, such as HF, $HNO_3$, $H_2SO_4$, or hydrogen peroxide, or the combination of two or more of the chemicals, can be used to remove the metallic binder 36 from cutter body 30 in the step of leaching. The O-ring 20 as the protected O-ring isolates the substrate section 32 from the strong acid. The integrity of the substrate section 32 is maintained to prevent a fatally flawed cutter.

Again, protection from acid damage is not the only functionality of the present invention. The total process time depends on the solution bath conditions, including acid strength and temperature, and the seal of the substrate section 32 must be maintained for the total process time. In the present invention, the step of leaching is for at least one day or 1-3 days at 60 degrees Celsius or higher so as to form a polycrystalline diamond compact cutter 40 from the cutter body 30 in FIG. 4. Any target profile of the diamond section 34 or diamond table can be achieved at this elevated temperature and during the time period for the percentage and distribution of remaining metallic binder 36 to be set in the diamond section 34. The present invention removes the metallic binder 36 in the designated thickness of the diamond table or diamond section 34 of the PDC cutter 40 with damage to the substrate section 32. The PDC cutter 40 of the present invention has more consistent quality and higher quality because the target profile of the diamond table can be achieved before failure of the protected O-ring. There is no premature stoppage of the leaching step of the prior art for preserving the protection of the substrate section.

FIG. 4 also shows the exposed O-ring 42 from the protected O-ring and initial O-ring 20 from the method of the present invention. The exposed O-ring 42 has a hardness reduction relative to the protected O-ring and a modulus reduction relative to the protected O-ring. The exposed O-ring 42 avoids a fatally device PDC cutter by maintaining the seal of the exposed O-ring 42 on the cutter body 30. In particular, the exposed O-ring 42 has a hardness reduction less than a hardness reduction of an exposed unprotected O-ring, that is, an O-ring without the protective layer of the present invention, relative to an unprotected O-ring. The exposed O-ring 42 also has a modulus reduction less than a modulus reduction of the exposed unprotected O-ring relative to the unprotected O-ring.

Figure 5:
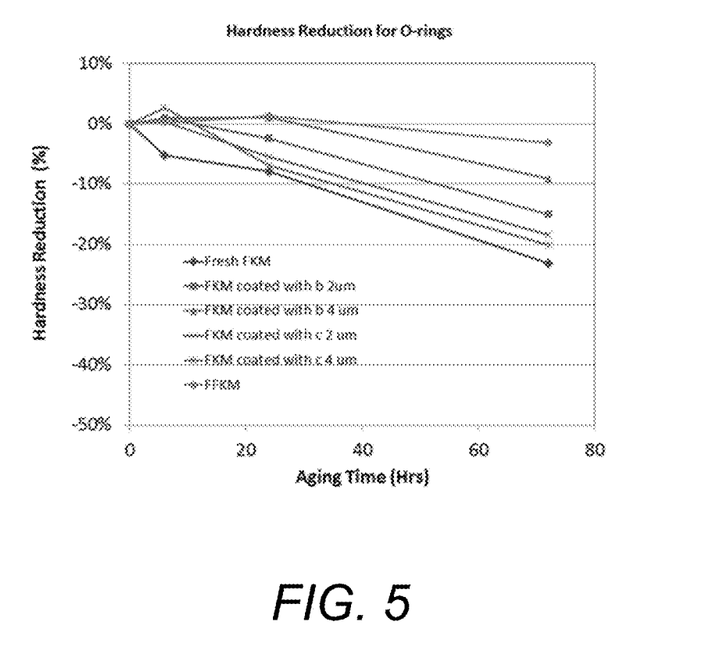
FIG. 5 is a graph illustration of Hardness Reduction for O-rings according to the embodiment of the coated layer as the protective layer of the present invention.

In one embodiment of the present invention, the step of applying the protective layer 22 is comprised of the steps of: coating a poly (para-xylene) on the O-ring 20 so as to form a coated layer as the protective layer 22. The coated layer can have a thickness of at least 1 micrometer or a range of 1-5 micrometers. In the present invention, the poly (para-xylene) is comprised of at least one of a group consisting of:

In an embodiment of the coated layer as the protective layer 22, the step of leaching the metallic binder is for 1-3 days at 60 degrees Celsius or higher, and the exposed O-ring has a hardness reduction of less than 20% as shown in FIG. 5. FIG. 5 is a graph illustration of Hardness Reduction for O-rings according to the embodiment of the coated layer as the protective layer 22. FIG. 5 shows the O-ring 20 being comprised of FKM and specific embodiments of Coating (b) and Coating (c).

Figure 6:
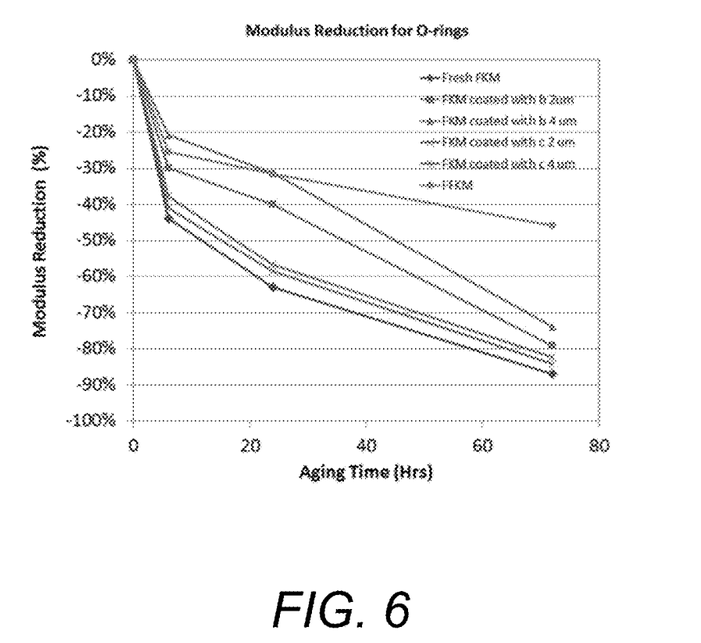
FIG. 6 is a graph illustration of Modulus Reduction for O-rings according to the embodiment of the coated layer as the protective layer of the present invention.

In the embodiment of the coated layer as the protective layer 22, the step of leaching the metallic binder is for 1-3 days at 60 degrees Celsius or higher, and the exposed O-ring has a modulus reduction of less than 90% as shown in FIG. 6. The method of the present invention includes the exposed O-ring 42 having both the hardness reduction of less than 20% and the modulus reduction of less than 90%. In an alternate embodiment, the step of leaching the metallic binder is one day at 60 degrees Celsius or higher, wherein the exposed O-ring has a modulus reduction less than 60% as shown in FIG. 6. FIG. 6 is a graph illustration of Modulus Reduction for O-rings according to the embodiment of the coated layer as the protective layer 22. FIG. 6 shows the O-ring 20 being comprised of FKM and specific embodiments of Coating (b) and Coating (c), similar to FIG. 5. The exposed O-ring 42 has both hardness and elasticity to seal the substrate section, while remaining intact against the highly acidic and high temperature conditions to effectively leach the diamond table as needed for high quality reliable cutters. The present invention identifies a time window so that many types of cutters and many patterns of diamond tables can be manufactured with quality and reliability.

In another embodiment of the present invention, the step of applying the protective layer 22 is comprised of the steps of: coating a fluoropolymer on the O-ring 20 so as to form a fluoro-coated layer as the protective layer 22. The fluoro-coated layer can have a thickness of greater than 1 micron or a range of 1-5 micrometers. In the present invention, the fluoropolymer is comprised of at least one of a group consisting of: polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

The step of coating the fluropolymer is comprised of the steps of: applying the fluoropolymer by liquid suspension on a surface of the O-ring 20, drying the fluoro-coated layer so as to remove water, and heating the fluoro-coated layer and the O-ring 20 so as to form the protected O-ring. Alternatively, the step of coating the flurupolymer is comprised of melt-coating the fluoropolymer on the O-ring 20.

Figure 7:
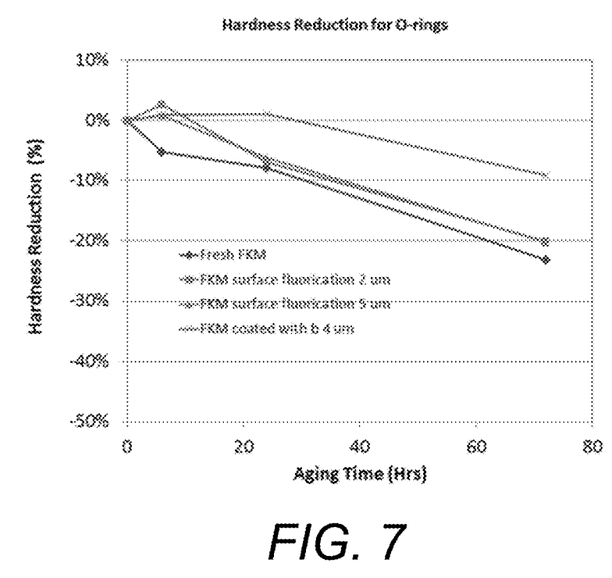
FIG. 7 is a graph illustration of Hardness Reduction for O-rings according to the embodiment of the fluorinated layer as the protective layer of the present invention.

In still another embodiment of the present invention, the step of applying the protective layer 22 is comprised of the steps of: fluorinating a surface of the O-ring 22 so as to form a fluorination layer as the protective layer 22. The fluorination layer can have a thickness of greater than 2 micrometers or a range of 2-4 micrometers. In one embodiment of the fluorinated layer as the protective layer 22, the step of leaching the metallic binder is 1-3 days at 60 degrees Celsius or higher, and the exposed O-ring has a hardness reduction relative to the protected O-ring less than 20% as shown in FIG. 7. FIG. 7 is a graph illustration of Hardness Reduction for O-rings according to the embodiment of the fluorinated layer as the protective layer 22. FIG. 7 shows the O-ring 20 being comprised of FKM and specific embodiments of fluorinated layer at 2 micrometer thickness and 5 micrometer thickness.

In yet another embodiment of the present invention, the step of applying the protective layer is comprised of the steps of: encapsulating the O-ring 20 with an encapsulating fluoropolymer so as to form an encapsulated layer as the protective layer 22. The encapsulated layer can have a thickness with a range of 1-20 micrometers. In the present invention, the encapsulated fluoropolymer is comprised of at least one of a group consisting of: polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

Figure 8:
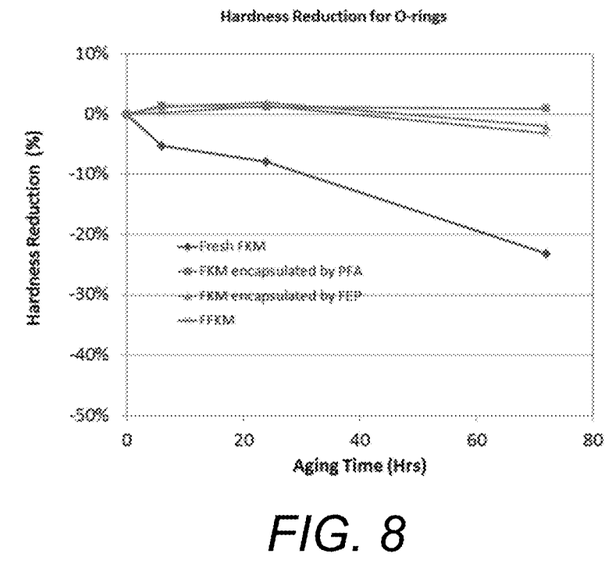
FIG. 8 is a graph illustration of Hardness Reduction for O-rings according to the embodiment of the encapsulated layer as the protective layer of the present invention.

In one embodiment of the encapsulated layer as the protective layer 22, the step of leaching the metallic binder is 1-3 days at 60 degrees Celsius or higher, and the exposed O-ring has a hardness reduction relative to the protected O-ring less than 5%. FIG. 8 is a graph illustration of Hardness Reduction for O-rings according to the embodiment of the encapsulated layer as the protective layer 22. FIG. 8 shows the O-ring 20 being comprised of FKM and specific embodiments of PFA and FEB as the encapsulated fluoropolymer.

Figure 9:
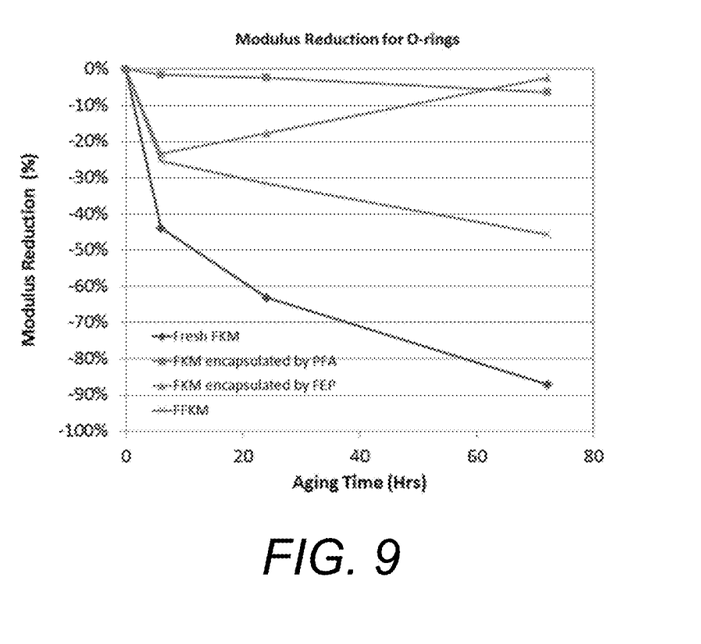
FIG. 9 is a graph illustration of Modulus Reduction for O-rings according to the embodiment of the encapsulated layer as the protective layer of the present invention.

In another embodiment of the encapsulated layer as the protective layer 22, the step of leaching the metallic binder is for 1-3 days at 60 degrees Celsius or higher, and the exposed O-ring has a modulus reduction relative to the protected O-ring less than 20% as shown in FIG. 9. The method of the present invention includes the exposed O-ring 42 having both the hardness reduction of less than 5% and the modulus reduction of less than 20%. FIG. 9 is a graph illustration of Modulus Reduction for O-rings according to the embodiment of the encapsulated layer as the protective layer 22. FIG. 9 shows the O-ring 20 being comprised of FKM and specific embodiments of PFA and FEB as the encapsulated fluoropolymer, similar to FIG. 8.

Figure 10A:
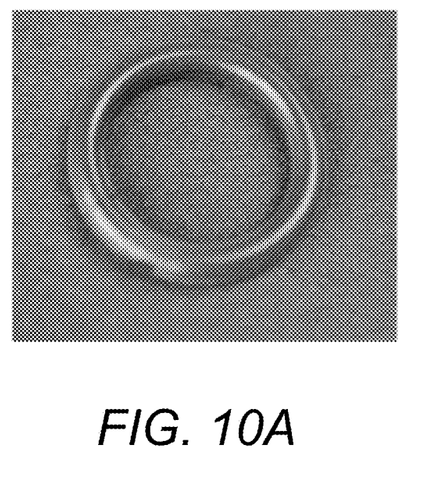
FIGS. 10A, 10B, 11A, 11B, 12A, 12B, 13A and 13B show photographs of embodiments of the O-ring being comprised of FKM and specific embodiments of PFA and FEB as the encapsulated fluoropolymer.
Figure 10B:
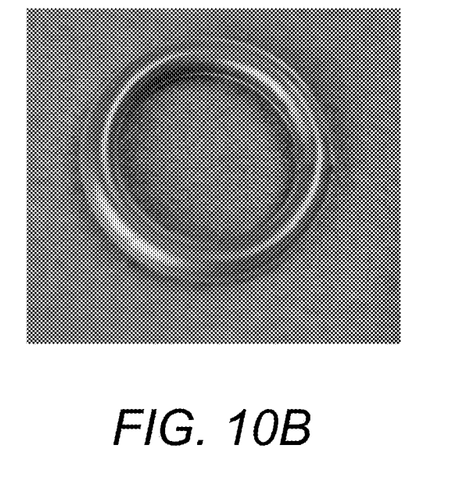
Figure 11A:
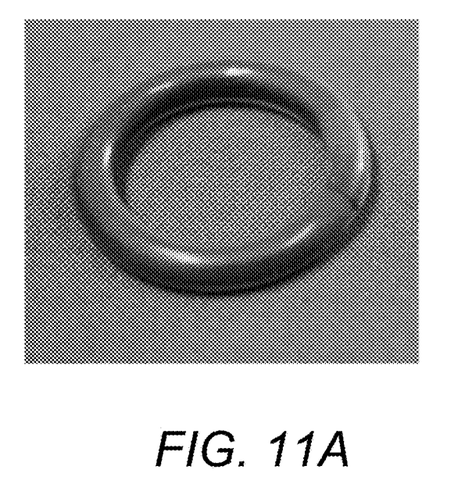
Figure 11B:
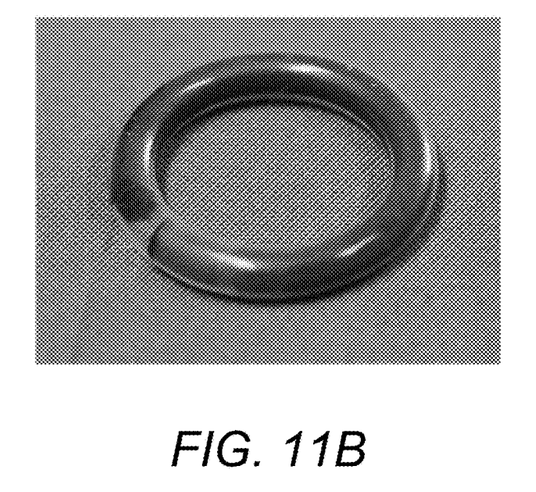
Figure 12A:
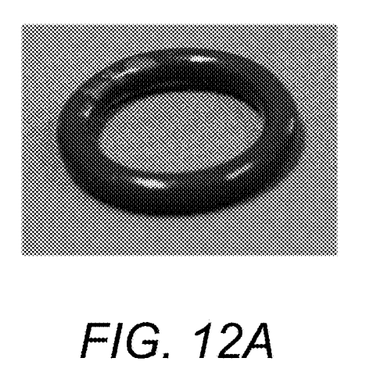
Figure 12B:
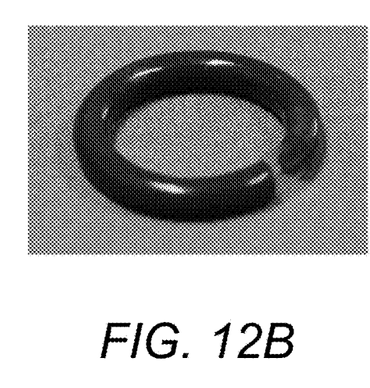

The embodiment of the encapsulated layer as the protective layer 22 further identifies a critical range. With less than 1 day (24 hours) at 100 degrees Celsius and the acidic conditions in the step of leaching, there is a failure which renders the exposed O-ring nonfunctional. Similar to FIGS. 8-9, FIGS. 10A, 10B, 11A, 11B, 12A, 12B, 13A and 13B show photographs of the O-ring 20 being comprised of FKM and specific embodiments of PFA and FEB as the encapsulated fluoropolymer, respectively. FIGS. 10A and 10B show the FKM O-ring with PFA encapsulated layer and the FKM O-ring with FEB encapsulated layer respectively as protected O-rings without any leaching. FIGS. 11A and 11B show the FKM O-ring with PFA encapsulated layer and the FKM O-ring with FEB encapsulated layer respectively after leaching conditions in acid 6 hours at 100 degrees Celsius. There are noticeable cracks in the O-ring, even as the encapsulated layer is maintained. FIGS. 12A and 12B also show the FKM O-ring with PFA encapsulated layer and the FKM O-ring with FEB encapsulated layer respectively after leaching conditions in acid 24 hours at 100 degrees Celsius. There are noticeable cracks in the O-ring, even as the encapsulated layer is maintained.

Figure 13A:
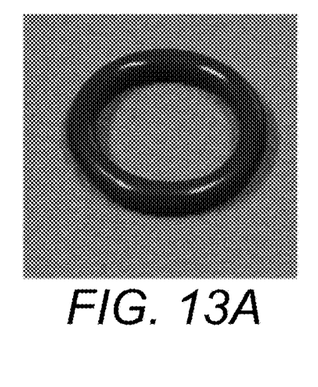
Figure 13B:
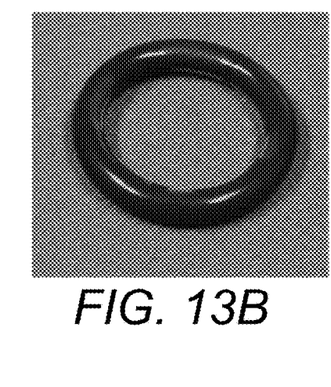

However, FIGS. 13A and 13B show the FKM O-ring with PFA encapsulated layer and the FKM O-ring with FEB encapsulated layer respectively after leaching conditions in acid 72 hours at 100 degrees Celsius. The O-rings are both intact, and the corresponding encapsulated layers are maintained. The removal from leaching conditions appears to affect the shorter exposure, while the threshold to maintain the O-ring is between 1-3 days.

The present invention is a method for forming a polycrystalline diamond compact (PDC) cutter for a drill bit. In the prior art processes, the step of leaching can take up to 21 days in order to achieve the target profile of the diamond table. There are extensive time and costs for this weeks-long process. When previously compensating for these shortcomings, the acids are stronger to reduce the time needed to achieve the target profile. However, these acids damage the substrate of the cutter such that the PDC cutter would have a higher chance of fatal defects. O-rings were used to protect the substrate, but the O-ring were still reactive to the strong acids in the leaching process. In order to preserve the O-ring and consequently, the substrate, the step of leaching was too short to achieve the target profile. The method of the present invention provides steps to identify a time window for forming cost efficient high quality and reliable PDC cutters. The method includes applying a protective layer to the O-ring so as to form a protected O-ring, while also increasing the temperature of the step of leaching beyond the prior art and determining a time window for sealing with sufficient hardness and elasticity in the highly acidic and high temperature conditions. Beyond applying a protective layer to withstand the strong acid of the step of leaching, the present invention elevates temperature and identifies the time window. The method maintains the sealing force of an O-ring during the step of leaching when forming a PCD cutter for a drill bit. There is a hardness reduction of a protected O-ring during the step of leaching conditions when forming a PCD cutter. There is a modulus reduction of a protected O-ring during the step of leaching conditions when forming a PCD cutter. The hardness reduction and modulus reduction determine a time window of manufacturing a high quality and reliable cutter because the substrate section remains sealed under the highly acidic and high temperature conditions. Additionally, the amount of hardness reduction and the amount of modulus reduction set time in the acid and temperature conditions of the step of leaching to achieve the target profile with consistency and reliability.

The foregoing disclosure and description of the invention is illustrative and explanatory thereof. Various changes in the details of the illustrated structures, construction and method can be made without departing from the true spirit of the invention.

We claim:
1. A method for forming cutters, the method comprising the steps of:
   setting a back cap into a pod so as to form an assembly with a pod cavity;
   applying a protective layer on an O-ring so as to form a protected O-ring,
   wherein said O-ring is comprised of at least one of a group consisting of: nitrile butadiene rubber (NBR), hydrogenated nitrile butadiene rubber (HNBR), Ethylene-propylene diene monomer (EPDM), Epichlorohydrin (ECO), Polyacrylic rubber (ACM), Fluorosilicone rubber (FVMQ), Fluoroelastomers (FKM), Copolymer of tetrafluoroethylene and propylene (FEPM), perfluoroelastomer (FFKM), and Silicone rubber;
   placing said protected O-ring around a cutter body, said cutter body being comprised of: a substrate section, and diamond section being comprised of a metallic binder;
   inserting said cutter body into said pod cavity so as to seal said substrate section within said pod,
   wherein said diamond section is comprised of an end portion extending outward from said pod, said end portion being sealed to said substrate section by said protected O-ring; and
   leaching said metallic binder through said end portion of said diamond section for at least 1 day at 60 degrees Celsius or higher so as to form a polycrystalline diamond compact cutter from said cutter body and an exposed O-ring from said protected O-ring, said exposed O-ring having a hardness reduction relative to said protected O-ring, said exposed O-ring having a modulus reduction relative to said protected O-ring.

2. The method, according to claim 1, wherein said hardness reduction relative to said protected O-ring is less than a hardness reduction of an exposed unprotected O-ring relative to an unprotected O-ring.

3. The method, according to claim 1, wherein said modulus reduction relative to said protected O-ring is less than a modulus reduction of an exposed unprotected O-ring relative to an unprotected O-ring.

4. The method, according to claim 1, wherein said step of applying said protective layer is comprised of the steps of:
coating a poly (para-xylene) on said O-ring so as to form a coated layer as said protective layer, said coated layer having a thickness of at least 1 micrometer.

5. The method, according to claim 4, wherein said coated layer has a thickness between 1-5 micrometers.

6. The method, according to claim 4, wherein said poly (para-xylene) is comprised of at least one of a group consisting of:

7. The method, according to claim 4, wherein said step of leaching said metallic binder is for 1-3 days at 60 degrees Celsius or higher, said exposed O-ring having said hardness reduction relative to said protected O-ring less than 20%.

8. The method, according to claim 7, wherein said step of leaching said metallic binder is for 1-3 days at 60 degrees Celsius or higher, said exposed O-ring having said modulus reduction relative to said protected O-ring less than 90%.

9. The method, according to claim 4, wherein said step of leaching said metallic binder is for 1-3 days at 60 degrees Celsius or higher, said exposed O-ring having said modulus reduction relative to said protected O-ring less than 90%.

10. The method, according to claim 4, wherein said step of leaching said metallic binder is for 1 day at 60 degrees Celsius or higher, said exposed O-ring having said modulus reduction relative to said protected O-ring less than 60%.

11. The method, according to claim 1, wherein said step of applying said protective layer is comprised of the steps of:
coating a fluoropolymer on said O-ring so as to form a fluoro-coated layer as said protective layer, said fluoro-coated layer having a thickness with a range of 1-5 micrometers,
wherein said fluoropolymer is comprised of at least one of a group consisting of: polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

12. The method, according to claim 11, where the step of coating said fluropolymer is comprised of the steps of:
applying said fluoropolymer by liquid suspension on a surface of said O-ring;
drying said fluoro-coated layer so as to remove water; and
heating said fluro-coated layer and said O-ring.

13. The method, according to claim 11, where the step of coating said fluropolymer is comprised of the steps of:
melt-coating said fluoropolymer on said O-ring.

14. The method, according to claim 1, wherein said step of applying said protective layer is comprised of the steps of:
fluorinating a surface of said O-ring so as to form a fluorination layer as said protective layer, said fluorination layer having a thickness with a range of 2-4 micrometers.

15. The method, according to claim 14, wherein said step of leaching said metallic binder is for 1-3 days at 60 degrees Celsius or higher, said exposed O-ring having said hardness reduction relative to said protected O-ring less than 20%.

16. The method, according to claim 1, wherein said step of applying said protective layer is comprised of the steps of:
encapsulating said O-ring with an encapsulated fluoropolymer so as to form an encapsulated layer as said protective layer, said encapsulated layer having a thickness with a range of 1-20 micrometers,
wherein said encapsulated fluoropolymer is comprised of at least one of a group consisting of: polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

17. The method, according to claim 16, wherein said step of leaching said metallic binder is for 1-3 days at 60 degrees Celsius or higher, said exposed O-ring having said hardness reduction less than 5%.

18. The method, according to claim 17, wherein said step of leaching said metallic binder is 1-3 days at 60 degrees Celsius or higher, said exposed O-ring having said modulus reduction less than 20%.

19. The method, according to claim 16, wherein said step of leaching said metallic binder is 1-3 days at 60 degrees Celsius or higher, said exposed O-ring having said modulus reduction less than 20%.

20. The method, according to claim 1, wherein said pod is comprised of at least one of a group consisting of: polytetrafluoroethylene (PTFE), perfluoroalkoxy (PFA), ethylenetetrafluoroethylene (ETFE), polychlorotrifluoroethylene (PCTFE), polyvinylidenefluoride (PVDF), fluorinated ethylene propylene copolymer (FEP), and ethylene chlorotrifluoroethylene (ECTFE).

* * * * *